Figure 1:
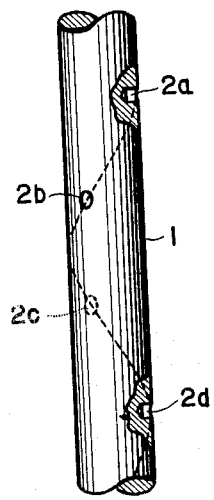

July 12, 1966  TERUO KUMANO ETAL  3,260,903
ELECTRICAL LIQUID LEVEL GAUGE
Filed July 24, 1964

3,260,903
ELECTRICAL LIQUID LEVEL GAUGE
Teruo Kumano and Tatsuo Nozaki, Tokyo, Japan, assignors to Nippon Denshi Sokki Kabushiki-Kaisha, Tokyo, Japan
Filed July 24, 1964, Ser. No. 384,985
Claims priority, application Japan, July 30, 1963, 38/54,871
1 Claim. (Cl. 317—246)

This invention relates in general to an electrical liquid level gauge and more particularly to a spacer for measuring electrodes for use in such a gauge.

As will be well known, an electrical liquid level gauge includes a pair of cylindrical metallic electrodes disposed coaxially with each other to form a measuring annular space having a predetermined fixed width therebetween. A level of liquid to be measured can be determined by electrically measuring an electrostatic capacity of that portion of the measuring space which is filled with the liquid in any conventional manner, in the assumption that the liquid has a constant dielectric constant at a measuring temperature. Therefore, in order for the electrical liquid level gauge to consistently indicate a precise reading for a liquid level, a spacing between the pair of electrodes must always be held exactly constant. To this end, a spacer or spacers is or are usually used to be sandwiched in between the two electrodes. The spacer used is required to maintain the predetermined exact distance between the electrodes, not to interfere with any variation in the liquid level to be measured, and to be coupled to the electrodes in such a manner that its weakening effect on the electrodes is minimum. Of course, the material of the spacer should resist to any chemical attack due to the liquid to be measured.

The chief object of the invention is to provide an improved spacer for separating a pair of coaxial cylindrical electrodes for use in an electrical liquid level gauge which spacer meet the requirements as described in the preceding paragraph.

Another object of the invention is to improve an electrical liquid level gauge by rendering the same substantially insensible to external vibrations.

According to the teachings of the invention a spacer for separating a pair of coaxial cylindrical electrodes from each other in an electrical liquid level gauge is composed of an electrically insulating material selected from the group consisting of tetrafluoroethylene, copolymers of hexafluoropropylene and tetrafluoroethylene, polyethylenes, polyamides, polyesters, polycarbonates, polyvinyl chlorides, glasses and ceramics dependent upon the type and temperature of a liquid to be measured. The spacer may be in the form of a rivet or a short rod having a predetermined fixed length. On the other hand, one of two coaxial cylindrical electrodes, for example, the internal electrode is provided on its external surface with a plurality of small recesses complementary in shape to the spacer and disposed on at least one predetermined line such as a helical line. Then the spacers are planted in the recesses on the internal cylindrical electrode so as to project beyond the surface of the internal electrode by a predetermined fixed length and the external cylindrical electrode is fitted onto the internal electrode whereupon the spacers serve to maintain both the electrodes a predetermined fixed distance determined by the length of that portion of each spacer projecting from the internal surface of the internal electrode.

Figure 2:
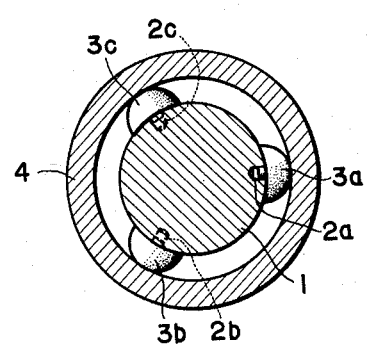

The invention will become more readily apparent from the following detailed description taken in conjunction with the accompanying drawings in which:

FIG. 1 shows a fragmental view of one measuring electrode according to the teachings of the invention; and FIG. 2 shows a cross sectional view of a structure of electrodes embodying the teachings of the invention.

In practicing the invention, one of two cylindrical electrodes made of any suitable metal such as aluminum is provided on that surface thereof facing the other electrode with a plurality of small recesses in a predetermined pattern. Such recesses may be preferably disposed at substantially equal intervals on a helical line on the external cylindrical surface of the internal electrode as shown in FIG. 1. In FIG. 1, the reference numeral 1 designates such an internal cylindrical electrode whose external surface has a plurality of small circular recesses 2a, 2b, 2c and 2d disposed at substantially equal intervals on a helical line denoted by dotted line thereon. It should be understood that the recesses may be, if desired, disposed in any other pattern, for example, on three generatrices for external cylindrical surface of the internal electrode positioned at angular distances of 120 degrees. The recesses as viewed from the one end of the electrode are preferably disposed at substantially equal angular intervals on the profile of the electrode.

A spacer which is fitted into individual one of the recesses is composed of any of electrically insulating materials as will be described hereinafter. As shown in FIG. 2, the spacer 3a, 3b or 3c can be in the form of a rivet whose stem is complementary in shape to the recess. It is to be noted that that portion of the spacer projecting beyond the surface of the electrode 1, in this case the head portion of each rivet 3a, 3b or 3c should have a predetermined fixed common length corresponding to a predetermined magnitude of spacing between the external and internal electrodes in their assembled positions.

During or after the spacers are fitted into the respective recesses on the internal electrode, an external electrode 4 is fitted onto the internal electrode 1 whereby both electrodes have the spacers sandwiched and maintained therebetween to form a unitary structure as shown in FIG. 2.

According to the teachings of the invention, a material for the spacers can be properly selected dependent upon the type and temperature of a liquid to be measured. The following materials have been found preferable to be used as the spacers. Tetrafluoroethylene available under the name "Teflon" can be used for liquified nitrogen, oxygen, argon, ammonia, butane and propane and petroleum at a temperature within a range of from $+200°$ to $-270°$ C. and may be advantageously employed to measure a liquid level of any combustible. Copolymers of hexafluoropropylene and tetrafluoroethylene such as available under the name "FEP" can be used for liquified nitrogen, oxygen, argon, chlorine, ammonia, butane and propane, and petroleum at a temperature between $+200°$ and $-270°$ C. and are characterized by chemical stability. Polyethylene can be used for liquified nitrogen, argon and carbon dioxide and water at a temperature between $+70°$ and $-200°$ C. Polyamides or nylon can be used for liquified nitrogen, and argon and various oils at a temperature ranging from $+100°$ to $-200°$ C. Polyesters available under the names "Dacron" and "Terylene" can be used for liquified nitrogen, argon and carbon dioxide, water and petroleum at a temperature ranging from $+100°$ to $-200°$ C. Polycarbonates such as available under the name "Delrin" can be used for liquified nitrogen, argon and carbon dioxide, water and petroleum at a temperature ranging from $+100°$ C. to $-200°$ C. The last-mentioned four resins are inexpensive but have somewhat small varieties of applications. Inexpensive polyvinyl chlorides can be used for various oils and liquified carbon dioxide at a temperature ranging from $+50°$ to $-50°$ C. In addition to the above mentioned synthetic resins, glasses and ceramics can be used for water, various oils and liquified hydrogen, nitrogen, oxygen, argon, chlorine, ammonia, butane and propane at a temperature of from +200° to −200° C. and of from +1000° to −270° C. respectively. Such inorganic spacers are expensive but most stable. In general, any material for the spacer has preferably its dielectric constant low as compared with the associated liquid to be measured.

It will be seen that with the spacers $3a$, $3b$, $3c$ . . . along a helical line at substantially equal intervals, there will be no more than any one spacer at any level along the space between the electrodes 1 and 4, and consequently the cross-sectional area of the liquid in the space between the electrodes will only be diminished by a single spacer at any point along the length of the electrodes. This arrangement accordingly minimizes the effect of the presence of the spacers on the measurement of the liquid level.

As an example, an aluminum circular tube having a length of 1280 mm. and an inside diameter of 7.8 mm. and an aluminum circular tube having an outside diameter of 6 mm. were used as the external and internal electrodes respectively to form an electrode assembly like that shown in FIG. 2 with a spacing therebetween of 0.9 mm. maintained by nylon spacers of rivet shape disposed at intervals of 70 mm. on a helical line and three spacers as viewed from one end of the electrodes being positioned at angular distances of 120 degrees on the profile thereof. The electrode assembly thus prepared was used to measure a level of liquified nitrogen whose dielectric constant is 1.43. The assembly exhibited an electrostatic capacity of 270 pf. in the absence of liquified nitrogen and an incremental capacity of 9 pf. per 100 mm. of the liquid column. The electrode assembly disposed within a container of Dewar type having an inside diameter of 375 mm. and containing liquified nitrogen exhibited an incremental capacity of approximately 8.75 pf. per 10 kg. of the content.

The invention has several advantages. For example, one of the cylindrical electrodes on which the mounting recesses are formed is less decreased in mechanical strength because they are not locally concentrated on the particular portion of the one electrode. Further the spacers are immersed one after another into a liquid to be measured resulting in small error in measurement. Also since the external electrode is supported by the internal electrode at a plurality of points, the electrode assembly is prevented from resonating to any external vibration and more particularly to any bending vibration, and further is effectively damped. In addition, the spacing between both electrodes is stably maintained and more or less curved circular tubes may be used as the electrodes without the necessity of straightening the tubes.

While the invention has been described in conjunction with a few embodiments thereof it is to be noted that various changes and modifications may be made without departing from the spirit and scope of the invention. For example, instead of a rivet-shaped spacer, short rods having a predetermined common length may be inserted into a groove whose depth is predetermined. Also the recesses or grooves may be formed on the external electrode.

What we claim is:

An electrical liquid level gauge consisting essentially of a pair of coaxial cylindrical electrodes, and a plurality of spacers for separating said pair of coaxial cylindrical electrodes from each other, each of said spacers being of an insulating material selected from the group consisting of tetrafluoroethylene, copolymers of hexafluoropropylene, and tetrafluoroethylene, polyethylenes, polyamides, polyesters, polycarbonates, polyvinyl chlorides, glasses and ceramics, and being in the form of a rivet having a head portion of a predetermined fixed axial dimension corresponding to the radial distance between the internal cylindrical surface of the external electrode and the external surface of the internal electrode and a stem portion, said plurality of spacers being disposed on that surface of one of the electrodes facing the other electrode along a helical line at substantially equal intervals measured along said helical line, the last-mentioned surface having a plurality of small recesses into which the stem portions are fitted.

References Cited by the Examiner
UNITED STATES PATENTS

| | | | |
|---|---|---|---|
| 2,759,134 | 8/1956 | Sullivan | 317—246 |
| 2,945,165 | 7/1960 | Franzel | 317—246 |
| 2,982,895 | 5/1961 | Exon | 317—246 |

ROBERT K. SCHAEFER, *Primary Examiner.*

JOHN F. BURNS, *Examiner.*

E. GOLDBERG, *Assistant Examiner.*